(12) United States Patent
Hilt et al.

(10) Patent No.: US 8,148,917 B2
(45) Date of Patent: Apr. 3, 2012

(54) FLASHLIGHT

(75) Inventors: Scott Hilt, Aberdeen, MD (US); Bradley J. Mealy, Abingdon, MD (US); David A. Carrier, Aberdeen, MD (US); Andrew E. Seman, Jr., Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 53 days.

(21) Appl. No.: 12/690,169

(22) Filed: Jan. 20, 2010

(65) Prior Publication Data

US 2010/0118523 A1     May 13, 2010

Related U.S. Application Data

(63) Continuation of application No. 11/545,032, filed on Oct. 6, 2006, now Pat. No. 7,705,542.

(60) Provisional application No. 60/724,609, filed on Oct. 7, 2005.

(51) Int. Cl.
*H05B 37/02* (2006.01)
(52) U.S. Cl. .................. 315/291; 362/194; 362/205
(58) Field of Classification Search ............... 315/185 S, 315/200 A, 129, 56–59, 291; 362/205, 802, 362/194
See application file for complete search history.

(56) References Cited

U.S. PATENT DOCUMENTS

| | | |
|---|---|---|
| 1,740,314 A | 2/1928 | Pitney |
| 2,029,861 A | 3/1935 | Dabgin |
| D113,702 S | 3/1939 | Bolser |

(Continued)

FOREIGN PATENT DOCUMENTS

DE          1617478          11/1950

(Continued)

OTHER PUBLICATIONS

European Search Report dated Feb. 2, 2009 for EP Application No. 09151245.9.

(Continued)

*Primary Examiner* — Douglas W Owens
*Assistant Examiner* — Amy Yang
(74) *Attorney, Agent, or Firm* — Amir Rohani

(57) ABSTRACT

A flashlight in accordance with an aspect of the invention includes an ID module for generating an ID signal indicative of a power mode of the flashlight. In an aspect, the flashlight mates with a removable battery pack that regulates at least one of an output voltage and output current in accordance with the ID signal. In an aspect, the flashlight includes a printed circuit board (PCB) on which the ID module is mounted. In an aspect, the flashlight includes a soft-start module and a bulb, wherein the soft start module increases power to the bulb at a controlled rate when the flashlight is turned on. In an aspect, the flashlight includes a lamp housing having a lens retained by a bezel. The lens includes an axially extending peripheral edge. In an aspect, the flashlight includes a main housing having a lamp housing. A mounting mechanism and mating features are adapted to selectively couple and decouple the main housing and the lamp housing. In an aspect, a flexible conduit connects the main housing and lamp housing. The flexible conduit can be formed in an arc having an apex that lies directly above a center of gravity of the flashlight when the main housing and the lamp housing are coupled, thereby allowing the flashlight to be balanced when the flexible conduit is used as a carrying handle.

14 Claims, 8 Drawing Sheets

U.S. PATENT DOCUMENTS

| | | | |
|---|---|---|---|
| 2,361,287 A | 10/1944 | Gustin | |
| 2,654,022 A | 6/1950 | Adamy et al. | |
| 2,956,476 A | 10/1958 | Rupert | |
| 3,361,900 A | 1/1968 | Berg et al. | |
| 3,441,336 A | 4/1969 | Gunderson | |
| D217,638 S | 5/1970 | Magi et al. | |
| 3,713,614 A | 1/1973 | Taylor | |
| 3,758,773 A | 9/1973 | Nau | |
| 4,071,812 A | 1/1978 | Walker | |
| 4,156,166 A | 5/1979 | Shapiro et al. | |
| 4,221,994 A | 9/1980 | Friedman et al. | |
| 4,230,970 A | 10/1980 | Potter et al. | |
| 4,237,405 A | 12/1980 | Kellis | |
| 4,307,689 A | 12/1981 | Raeske et al. | |
| 4,326,161 A | 4/1982 | Kreinberg | |
| 4,345,304 A | 8/1982 | Penney et al. | |
| 4,499,525 A | 2/1985 | Mallory | |
| 4,772,805 A | 9/1988 | Kawata | |
| 4,841,198 A | 6/1989 | Wihelm | |
| 4,849,683 A | 7/1989 | Floid | |
| 4,875,146 A | 10/1989 | Drane | |
| 4,902,958 A | 2/1990 | Cook, II | |
| 4,939,626 A | 7/1990 | Hohenstein | |
| 4,949,016 A | 8/1990 | De Bijl et al. | |
| 5,027,052 A | 6/1991 | Bauch et al. | |
| 5,036,444 A | 7/1991 | Hiles | |
| 5,053,680 A | 10/1991 | Lauursema | |
| 5,154,483 A | 10/1992 | Zeller | |
| 5,154,509 A | 10/1992 | Wulfman et al. | |
| 5,214,353 A | 5/1993 | Nilssen | |
| 5,369,556 A | 11/1994 | Zeller | |
| 5,418,433 A | 5/1995 | Nilssen | |
| 5,498,934 A | 3/1996 | Nilssen | |
| D369,874 S | 5/1996 | Santarsiero | |
| 5,521,803 A | 5/1996 | Eckert et al. | |
| D372,318 S | 7/1996 | Szymanski | |
| D373,646 S | 9/1996 | Szymanski et al. | |
| 5,567,115 A | 10/1996 | Carbone | |
| 5,645,341 A | 7/1997 | Liao | |
| 5,687,774 A | 11/1997 | Chiang | |
| D388,206 S | 12/1997 | Carbone et al. | |
| 5,707,137 A | 1/1998 | Hon | |
| 5,765,938 A | 6/1998 | Rousso et al. | |
| 5,791,763 A | 8/1998 | Kam-Hoi | |
| 5,842,779 A | 12/1998 | Siebert | |
| D408,566 S | 4/1999 | Welsh et al. | |
| 5,906,426 A | 5/1999 | Farrington et al. | |
| 5,929,141 A * | 7/1999 | Lau et al. | 523/458 |
| D413,175 S | 8/1999 | Kaiser et al. | |
| 5,944,407 A | 8/1999 | Lynch et al. | |
| 5,951,142 A | 9/1999 | Wang et al. | |
| 6,007,214 A | 12/1999 | Shiao | |
| 6,040,660 A | 3/2000 | Schmidt et al. | |
| 6,109,772 A | 8/2000 | Futami et al. | |
| 6,160,355 A * | 12/2000 | Yee | 315/200 A |
| 6,244,731 B1 | 6/2001 | Koiko et al. | |
| 6,244,732 B1 | 6/2001 | Futami et al. | |
| 6,280,050 B1 | 8/2001 | Bird et al. | |
| 6,316,880 B1 | 11/2001 | Broadhurst | |
| 6,366,028 B1 | 4/2002 | Wener et al. | |
| 6,450,675 B1 | 9/2002 | Nishimoto et al. | |
| 6,566,843 B2 | 5/2003 | Takano et al. | |
| 6,702,452 B2 | 3/2004 | Jigamian et al. | |
| 6,718,136 B2 | 4/2004 | Bird et al. | |
| 6,814,470 B2 | 11/2004 | Rizkin et al. | |
| 6,841,941 B2 | 1/2005 | Kim et al. | |
| 6,874,908 B2 | 4/2005 | Sharrah et al. | |
| 6,902,293 B2 | 6/2005 | Tang | |
| 6,909,250 B2 | 6/2005 | Jigamian et al. | |
| 6,987,366 B2 | 1/2006 | Yu | |
| 7,508,171 B2 | 3/2009 | Carrier et al. | |
| 2001/0012204 A1* | 8/2001 | Sharrah et al. | 362/184 |
| 2003/0095403 A1* | 5/2003 | Tang | 362/183 |
| 2004/0056774 A1* | 3/2004 | Schleicher | 340/815.45 |
| 2004/0090189 A1* | 5/2004 | Yoneda et al. | 315/291 |
| 2004/0090776 A1 | 5/2004 | Yang | |
| 2004/0145891 A1 | 7/2004 | Heine et al. | |
| 2005/0002186 A1 | 1/2005 | Krieger et al. | |
| 2005/0007766 A1 | 1/2005 | Jigamian | |
| 2005/0007777 A1 | 1/2005 | Klipstein et al. | |
| 2005/0200312 A1 | 9/2005 | Komiya et al. | |
| 2006/0001381 A1 | 1/2006 | Robinson et al. | |

FOREIGN PATENT DOCUMENTS

| | | |
|---|---|---|
| DE | 1729706 | 9/1956 |
| DE | 1765830 | 4/1958 |
| DE | 1830886 | 5/1961 |
| DE | 1955505 | 2/1967 |
| DE | 1961166 | 6/1967 |
| DE | 6811112 | 8/1969 |
| DE | 1597941 | 10/1970 |
| DE | 8304428 | 5/1983 |
| DE | 3308959 | 9/1984 |
| DE | 8318248 | 12/1984 |
| DE | P3625917.9 | 11/1987 |
| DE | 3711174 | 12/1988 |
| DE | 3738055 | 5/1989 |
| DE | 3800950 | 10/1989 |
| DE | 3843036 | 6/1990 |
| DE | 3900908 | 7/1990 |
| DE | 9001268 | 7/1990 |
| DE | 3429427 | 7/1991 |
| DE | 4327767 | 11/1994 |
| DE | 9416575 | 3/1995 |
| DE | 29600816 | 4/1996 |
| DE | 29600814 | 5/1996 |
| DE | 29608088 | 9/1996 |
| DE | 29801247 | 5/1998 |
| DE | 29800358 | 12/1998 |
| DE | 20016174 | 4/2001 |
| DE | 19957512.6 | 5/2001 |
| DE | 10161017 | 6/2003 |
| DE | 10162941 | 8/2003 |
| DE | 202004009 | 10/2004 |
| DE | 202004010865 | 12/2004 |
| DE | 10354176.4 | 8/2005 |
| DE | 102004012705 | 10/2005 |
| DE | 10200048232 | 4/2006 |
| EP | 0265396 | 4/1988 |
| EP | 0460736 | 12/1991 |
| EP | 0683354 | 11/1995 |
| EP | 1312855 A2 | 1/2002 |
| EP | 1312855 | 5/2003 |
| EP | 1411750 | 4/2004 |
| EP | 1411750 A2 | 4/2004 |
| GB | 218193 | 7/1924 |
| GB | 711817 | 7/1954 |
| GB | 2280254 | 1/1995 |
| JP | 53681 | 1/1978 |
| JP | 63301488 | 12/1988 |
| JP | 01173598 | 7/1989 |
| WO | WO-03/052317 | 6/2003 |
| WO | WO-2005/008122 | 1/2005 |

OTHER PUBLICATIONS

European Search Report dated Feb. 19, 2008 for EP Application 06121751.9.

European Search Report dated Feb. 8, 2009 for EP Application 06121751.9.

Rejection decision dated Dec. 8, 2011 from Chinese Patent Office for corresponding Chinese Application No. 200610064748.3, and English translation thereof.

* cited by examiner

FLASHLIGHT

CROSS-REFERENCE TO RELATED APPLICATIONS

This application is a continuation of U.S. patent application Ser. No. 11/545,032 filed on Oct. 6, 2006 (now allowed). U.S. Ser. No. 11/545,032 claims the benefit of U.S. Provisional Application No. 60/726,609, filed on Oct. 7, 2005. The entire disclosures of these applications are incorporated herein by reference.

FIELD

The present disclosure relates to flashlights.

BACKGROUND

Portable flashlights use bulbs, such as incandescent lamps and light emitting diodes (LEDs), which are designed to operate at a rated voltage. The light output from the bulb is generally undesirably low when the bulb is operated at less than its rated voltage, and the bulb life is generally shortened when it is operated at greater than its rated voltage. The rated voltage therefore determines an output voltage of the power supply, which is generally provided by batteries that a particular flashlight will need to accommodate. For example, if a flashlight is being designed for a bulb having a rated voltage of 4.5V, then the flashlight will generally need to accommodate three 1.5V cells, such as standard "AAA", "AA", "C" or "D" cells.

The relationship between the rated voltage and the batteries causes manufacturers and distributors of flashlights to stock an undesirably large assortment of batteries to accommodate the various rated bulb voltages.

SUMMARY

A flashlight in accordance with an aspect of the invention includes an ID module for generating an ID signal indicative of a power mode of the flashlight.

In an aspect, the flashlight mates with a removable battery pack that regulates at least one of an output voltage and output current in accordance with the ID signal.

In an aspect, the flashlight includes a printed circuit board (PCB) on which the ID module is mounted. The flashlight may further include a filter circuit electrically coupled between the power contact of the flashlight and the bulb and mounted on the PCB. The flashlight may even further include a fuse mounted on the printed circuit board, the fuse electrically connected in series with the power contact of the flashlight.

In an aspect, the flashlight includes a soft-start module and a bulb, wherein the soft start module increases power to the bulb at a controlled rate when the flashlight is turned on.

A flashlight in accordance with an aspect of the invention includes a lamp housing having a lens retained by a bezel. The lens includes an axially extending peripheral edge.

A flashlight in accordance with an aspect of the invention includes a main housing having a lamp housing. A mounting mechanism and mating features are adapted to selectively couple and decouple the main housing and the lamp housing.

A flashlight in accordance with an aspect of the invention includes a flexible conduit that connects a main housing and a lamp housing. The flexible conduit can be formed in an arc having an apex that lies directly above a center of gravity of the flashlight when the main housing and the lamp housing are coupled, thereby allowing the flashlight to be balanced when the flexible conduit is used as a carrying handle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

DETAILED DESCRIPTION

Figure 1:
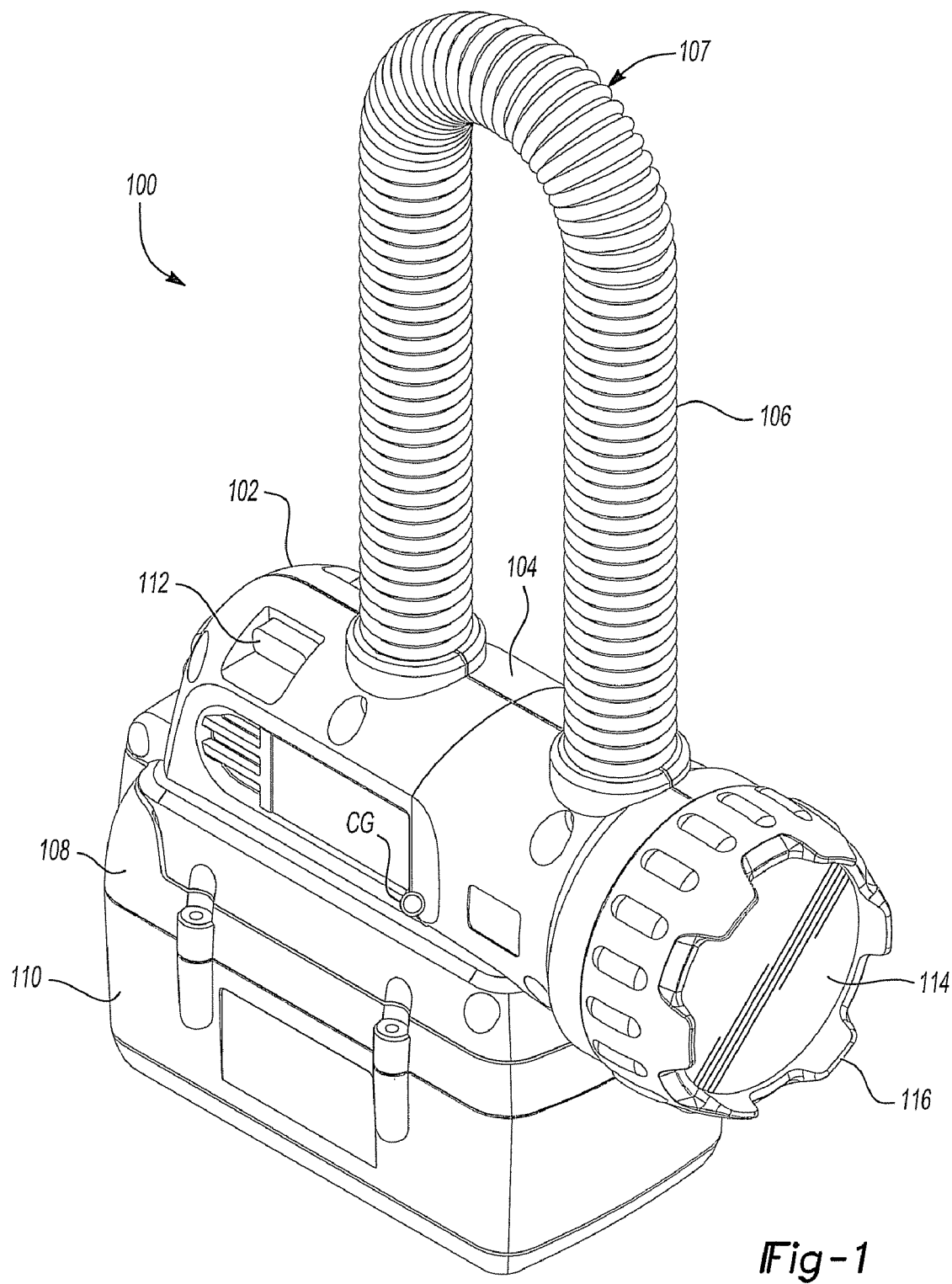
FIG. 1 is a top perspective view of a flashlight in a closed position.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Turning now to FIG. 1, a flashlight 100 in accordance with an aspect of the invention is shown. The flashlight 100 includes a main housing 102 that is separable from a lamp housing 104. A flexible conduit 106 connects the main housing 102 to the lamp housing 104 and provides a protective sheath for electrical conductors. The flexible conduit 106 also acts as an adjustable supporting neck for the lamp housing 104 when the lamp housing 104 is detached from the main housing 102.

The flexible conduit 106 can be formed in an arc having an apex 107 that lies directly above a center of gravity CG of the flashlight 100 when the main housing 102 and the lamp housing 104 are coupled, thereby allowing the flashlight 100 to be balanced when the flexible conduit 106 is used as a carrying handle.

The main housing 102 includes a mounting base 108 for engaging a battery pack 110. The battery pack 110 provides power that is switched by a switch 112 located in the main housing 102 of the flashlight 100. The switch 112 can be transversely mounted with respect to the main housing 102 such that the switch 112 can be pushed in one direction to turn the flashlight 100 on and pushed in an opposite direction to turn the flashlight 100 off.

The lamp housing 104 includes a lens 114. The lens 114 is retained by a bezel 116 and protects a bulb 140 (FIG. 6) and reflector 136 that are positioned in the lamp housing 104.

Figure 2:
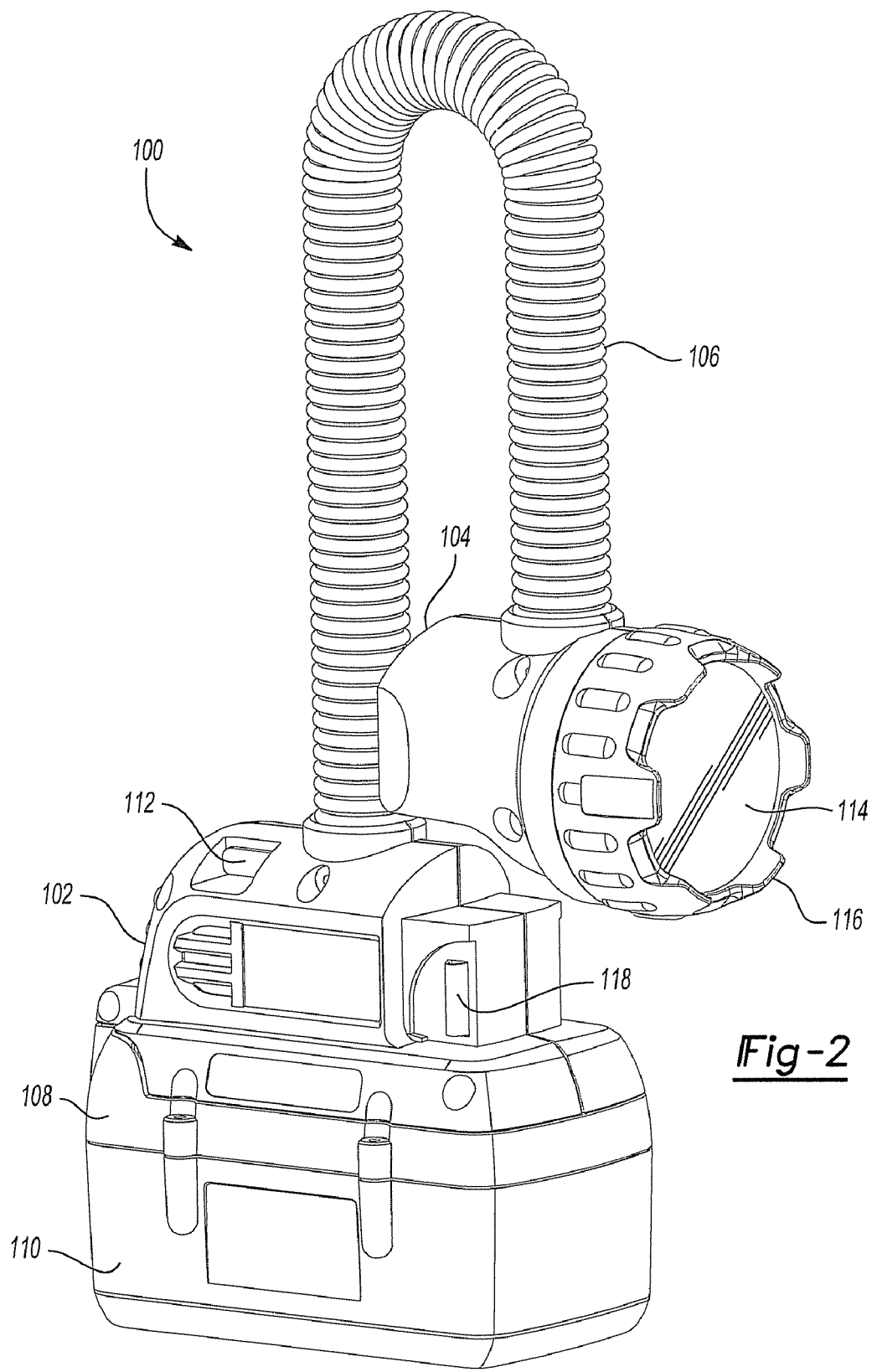
FIG. 2 is a top perspective view of a flashlight in an open position.

Turning now to FIG. 2, the lamp housing 104 is shown detached from the main housing 102. The flexible conduit 106 supports the lamp housing 104 in a fixed position with respect to the main housing 102. The flexible conduit 106 is semi-rigid such that it can be bent repeatedly and retains its new shape.

Figure 3:
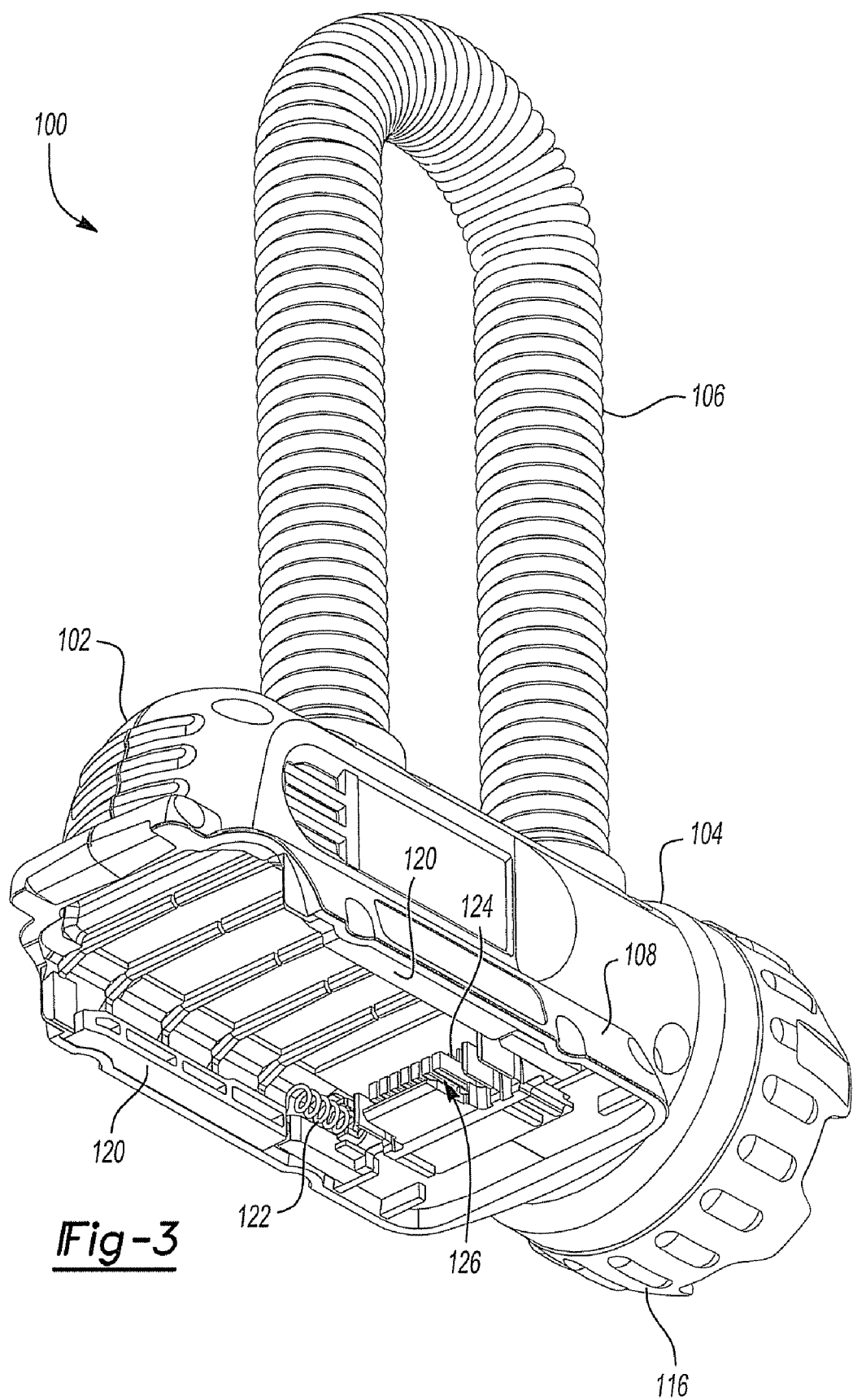
FIG. 3 is a bottom perspective view of a flashlight in a closed position.

Turning now to FIG. 3, a bottom perspective view of the flashlight 100 is shown. An interior of the mounting base 108 includes rails 120 and/or other features that are arranged to locate and retain the battery pack 110 with respect to the mounting base 108. Springs 122 and/or other elastic members can be included in the mounting base 108 to urge against and assist in removing the battery pack 110 from the mounting base 108. An electrical connector 124 has a plurality of contacts 126 and is positioned in the mounting base 108. The contacts 126 engage mating contacts of the battery pack 110 when it is located on the mounting base 108. Each of the contacts 126 carries a corresponding electrical signal that will be described later.

Figure 4:
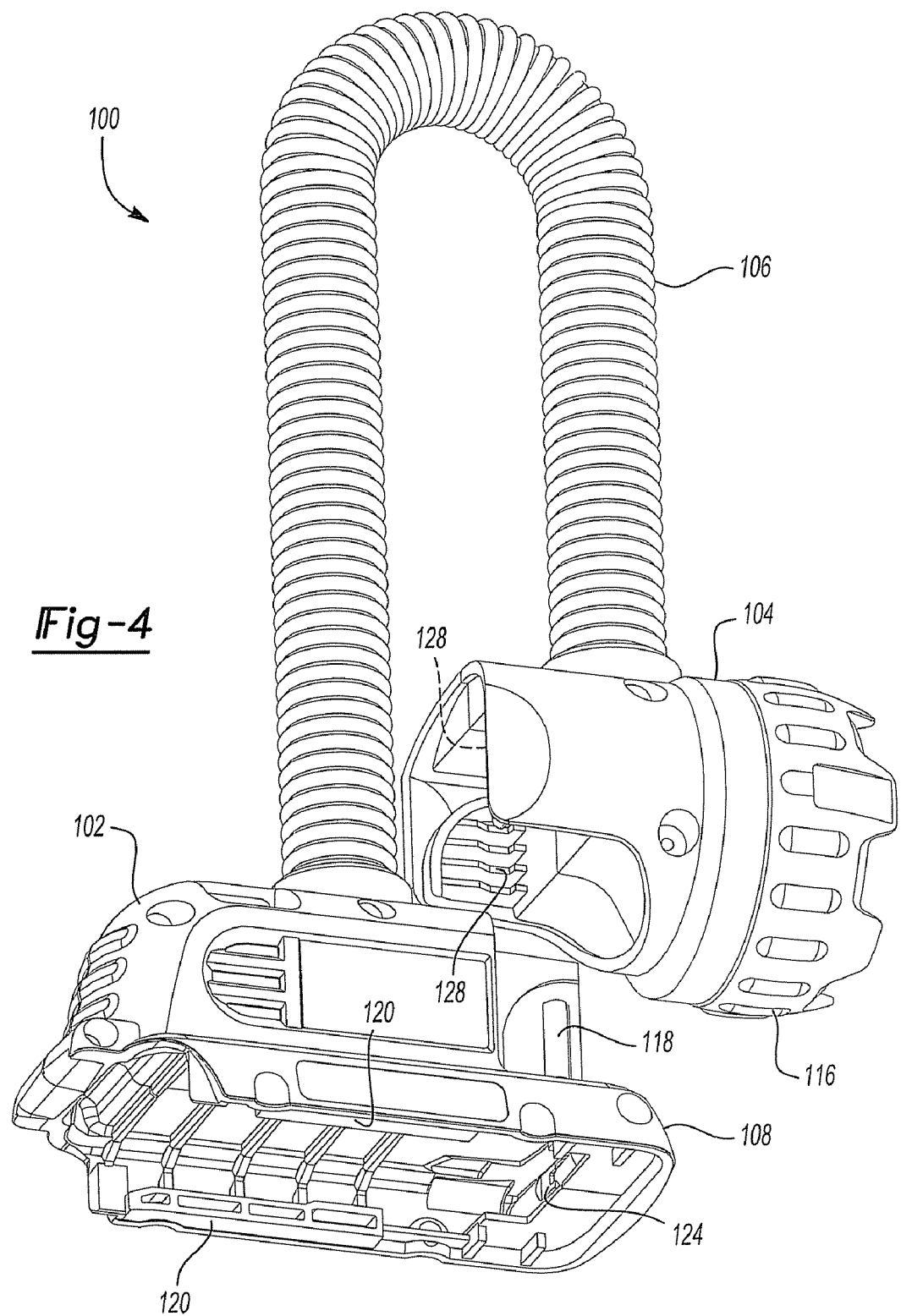
FIG. 4 is a bottom perspective view of a flashlight in an open position.

Turning now to FIG. 4, a bottom perspective view of the flashlight 100 is shown. The main housing 102 includes a retaining mechanism 118. The retaining mechanism 118 engages a mating feature 128 in the lamp housing 104. By way of non-limiting example, the retaining mechanism 118 can include a catch that engages a detent in the housing 104. Alternatively and by way of non-limiting example, the retaining mechanism 118 can include a magnet that is attracted to a corresponding magnet and/or ferrous material positioned in the lamp housing 104. In another embodiment, the retaining mechanism 118 can be located on the lamp housing 104 and the mating features can be located on the main housing 102.

The mating features 128 cooperate with the retaining mechanism 118 to allow the lamp housing 104 to be selectively attached to, and released from, the main housing 102. For example, when the retaining mechanism 118 includes catches, the mating features 128 can include detents that are engaged by the catches when the lamp housing 104 is attached to the lamp housing 102. Similarly, when the retaining mechanism 118 includes magnets, the mating features 128 can include ferrous metal and/or second magnets. The ferrous metal and/or second magnets are then attracted to the retaining mechanism 118 when the lamp housing 104 is attached to the lamp housing 102. The lamp housing 104 can be independently adjusted to point light to an area needed by the user when it is released from the main housing 102.

Figure 5:
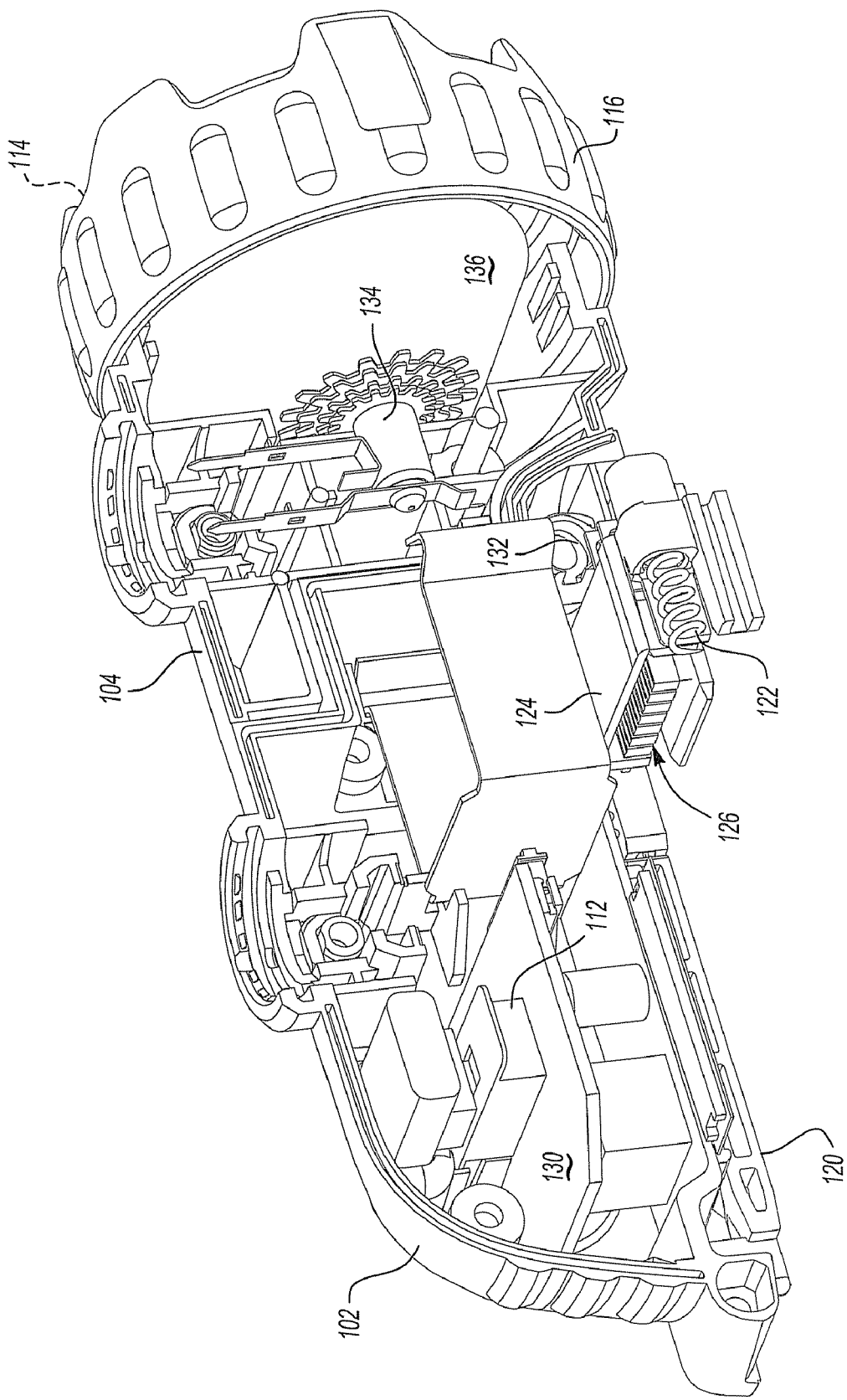
FIG. 5 is a partial sectional view of a flashlight.

Turning now to FIG. 5, a partial cross section of the flashlight 100 is shown in a closed position. The main housing 102 includes a printed circuit board 130 (PCB). The switch 112 is mounted to the PCB 130 and conductors 132 connect the electrical connector 124 to the PCB 130. Other conductors (not shown) route through the flexible conduit 106 and connect the PCB 130 to a bulb socket 134. The PCB 130 also mounts other circuit components that will be described later.

The lamp housing 104 includes a reflector 136 that is retained by the bezel 116. Light from the bulb 140 (FIG. 6) is reflected by the reflector 136 to the lens 114 from which it emanates from the flashlight 100.

Figure 6:
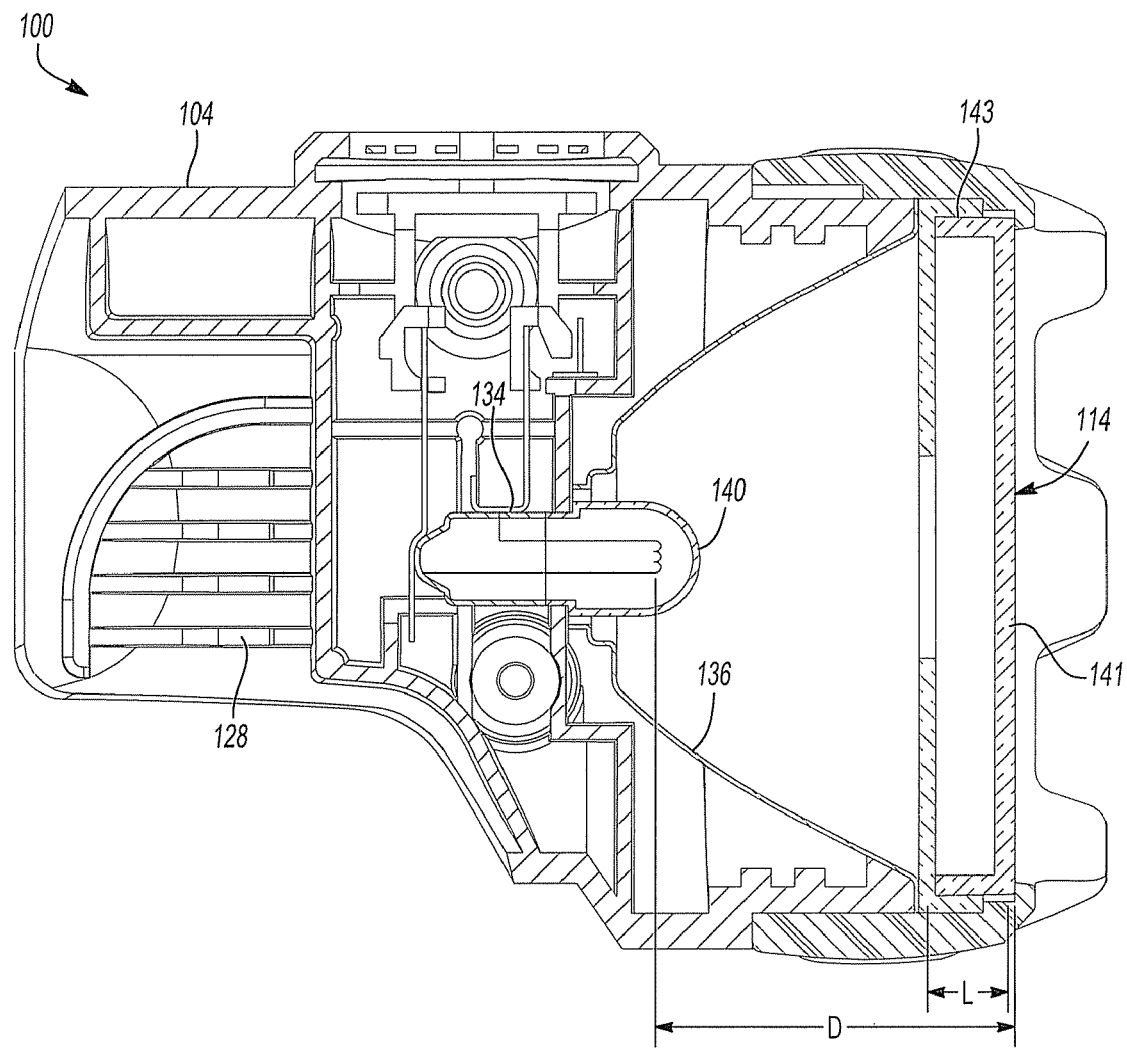
FIG. 6 is a cross-sectional view of a lamp housing.

Turning now to FIG. 6, a cross-section of the lamp housing 104 is shown. The bulb 140 mounts in the bulb socket 134. The bulb 140 has a rated voltage and/or operating voltage range and can be a type such as incandescent, light emitting diode (LED), halogen, xenon, arc-discharge, or other type. The lens 114 is cup-shaped and includes a lens face 141 and an axially extending peripheral skirt 143 that extends from a periphery of the lens face 141 of the lens 114 toward the bulb 140. The axially extending peripheral skirt 143 spaces the lens face 141 and the lens 114 from the bulb 140 to reduce the heat from the bulb 140 to which the lens face 141 is exposed. A length L of the axially extending peripheral skirt 143 is selected so that a distance D between the lens face 141/lens 114 and the bulb 140 is sufficiently long so as to prevent the lens face 141 of the lens 114 from becoming undesirably warm. The axially extending peripheral skirt 143 allows geometry of the reflector 136 to be common for a plurality of flashlight versions, including the flashlight 100, that have bulbs 140 of various wattages and/or various lengths of D and/or L. The axially extending peripheral skirt 143 therefore provides an opportunity for reducing costs of designing and providing tooling for various reflectors that would otherwise be associated with producing a plurality of flashlight versions, including the flashlight 100.

Figure 7:
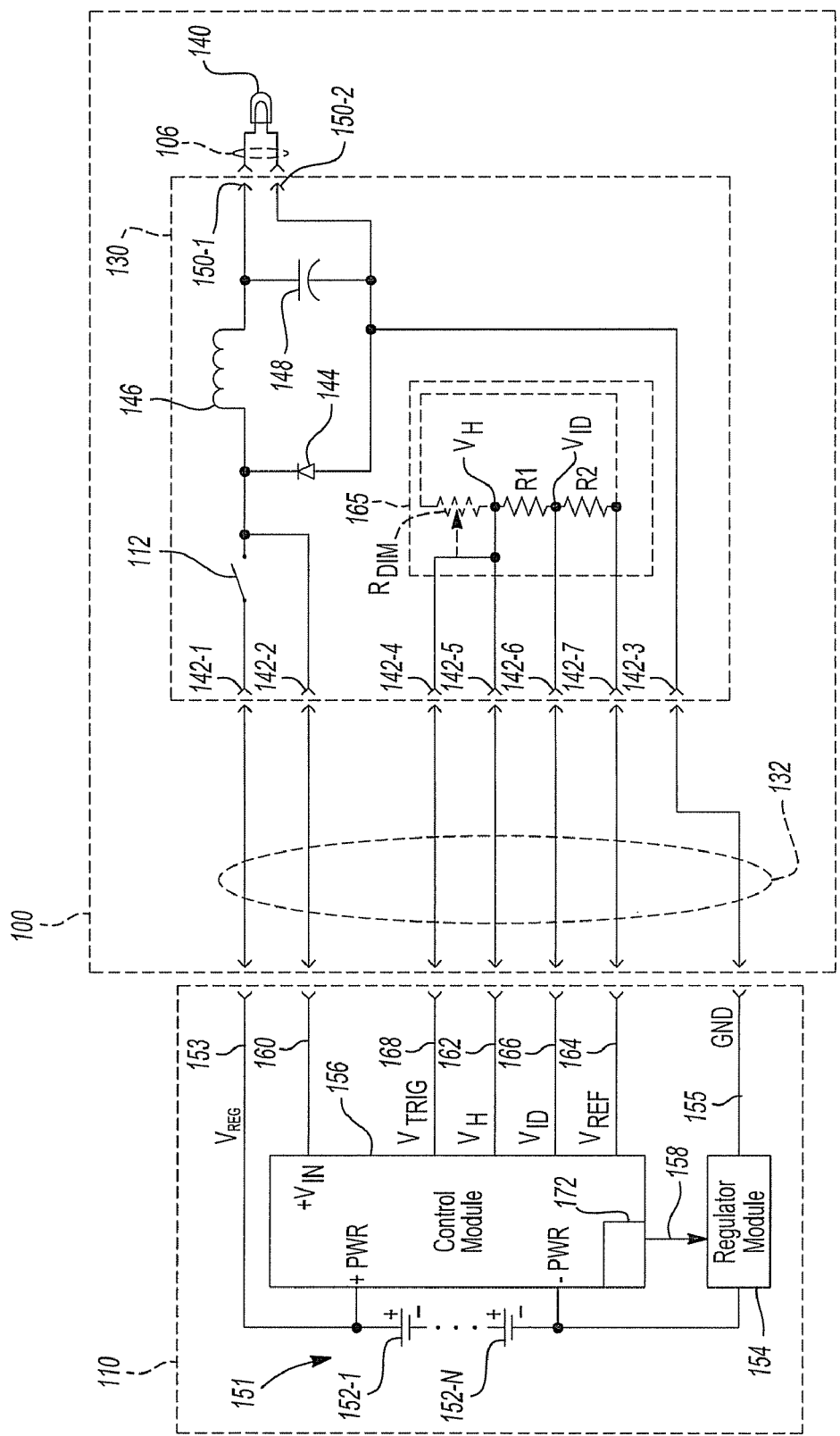
FIG. 7 is a schematic diagram of a flashlight and an associated battery pack.

Turning now to FIG. 7, a schematic diagram is shown of the flashlight 100 together with a block diagram of the battery pack 110. The circuit components of the flashlight 100 are mounted to the PCB 130. The circuit components can be different for various versions of the flashlight 100. Mounting the circuit components to the PCB 130 allows each version of the flashlight 100 to accommodate unique circuit components that would otherwise have to be included in the battery pack 110. The conductors 132 connect to corresponding PCB contacts 142-1, 142-2, ..., 142-7, referred to collectively as PCB contacts 142. In an illustrative embodiment, the circuit components may be secured to PCB 130 with adhesive to enhance drop/impact resistance. In an illustrative embodiment, the circuit components secured to PCB 130 by adhesive may include ID module 165 (described below) and its components, switch 112, and connector 124.

The PCB contact 142-1 connects to a first contact of the switch 112. A second contact of the switch 112 connects to a cathode of a diode 144 and to a first end of an inductor 146. A second end of the inductor 146 connects to a first end of a capacitor 148 and to a first bulb wiring contact 150-1. The PCB contact 142-2 connects to the second contact of the switch 112, the cathode of the diode 144, and the first end of the inductor 146. The PCB contact 142-3 connects to an anode of the diode 144, a second end of the capacitor 148, and a second bulb wiring contact 150-2. The bulb wiring contacts 150-1 and 150-2 connect to the conductors that route through the flexible conduit 106 and provide power to the bulb 140.

The PCB contact 142-5 connects to a first end of a resistor R1. A second end of the resistor R1 connects to a first end of a resistor R2 and to the PCB contact 142-6. A second end of the resistor R2 connects to the PCB contact 142-7. The PCB contact 142-4 provides a trigger signal and generally connects to the PCB contact 142-5 and the first end of the resistor R1. Optionally, as shown in phantom in FIG. 7, the trigger signal can be generated by a wiper of a dimmer potentiometer $R_{DIM}$. When the dimmer potentiometer $R_{DIM}$ is used, the PCB contact 142-4 is connected to the wiper of the dimmer potentiometer $R_{DIM}$ and not to the PCB contact 142-5. A function of the trigger signal is described below. The dimmer potentiometer $R_{DIM}$ also includes a first end connected to the PCB contact 142-5 and a second end connected to the PCB contact 142-7. If used, the dimmer potentiometer $R_{DIM}$ is preferably arranged to be readily adjustable by a user of the flashlight 100.

The battery pack 110 includes a battery 151 having one or more cells 152-1, ..., 152-N, referred to collectively as cells 152. The battery 151 may illustratively be a rechargeable battery. The cells 152 may illustratively be lithium ion battery cells. A positive node of the cells 152 connects to a regulated voltage output 153 of the battery pack 110. A negative node of the cells 152 connects to a first terminal of a regulator module 154. A second terminal of the regulator module 154 connects to a negative, or ground (GND), terminal 155 of the battery pack 110. A control module 156 includes a control signal output 158 that communicates a control signal to a third terminal of the regulator module 154. The regulator module 154 controls current flow between its first and second terminals in accordance with the control signal output 158.

The control module 156 also includes a sense input 160, a voltage output 162, a voltage output reference 164, an identification (ID) signal input 166, and a trigger input 168 that receives the trigger signal. The sense input 160 receives an on/off signal from the second contact of the switch 112 and accordingly switches the control module 156 between an awake state and a sleep state.

The voltage output 162 and the voltage output reference 164 ($V_{REF}$) apply an excitation voltage $V_H$, which may illustratively be 5V, across an identification (ID) module 165 that is located in the flashlight 100. The ID module 165 is shown as being implemented with a resistor divider formed from the resistors R1 and R2, however other implementations are possible as will be described below. The ID module 165 generates an ID signal ($V_{ID}$) that is indicative of a power mode of the flashlight 100. The ID signal may illustratively be indicative of power mode selected from 18V average voltage, 18V root mean square (RMS) voltage, 24V average voltage, 36V with current limit, and calibration mode. The control module 156 receives the ID signal at the ID signal input 166.

In a first embodiment, the control module 156 uses the ID signal and the trigger signal to determine a set point for the regulated voltage output 153. If the wiper of the optional dimmer potentiometer $R_{DIM}$ is connected to the PCB contact 142-4, then the trigger signal indicates a percentage of the power mode voltage and/or current that should be used for the set point. If the dimmer potentiometer $R_{DIM}$ is omitted, then the trigger signal connects to the excitation voltage $V_H$ and indicates that the set point is 100% of the power mode voltage and/or current.

Figure 7A:
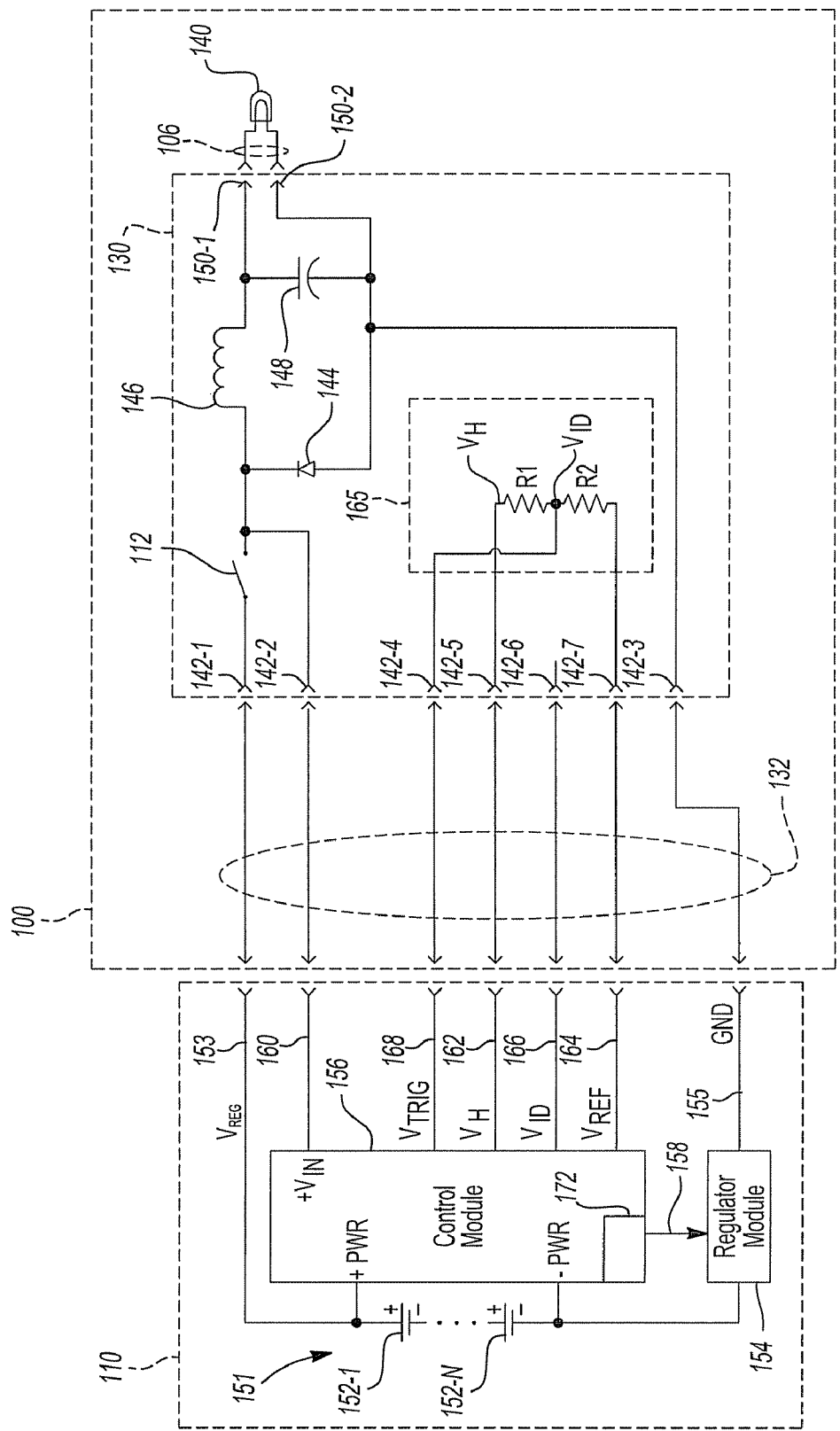
FIG. 7A is an alternative schematic diagram of a flashlight and an associated battery pack.

Referring now to FIG. 7A, an alternative embodiment is shown wherein the set point is determined exclusively by the trigger signal. In this alternative embodiment, the control module 156 is adapted to operate in only one of the power modes and the ID signal is applied to the trigger signal input 168. The dimmer potentiometer $R_{DIM}$ is omitted.

In the embodiments of FIGS. 7 and 7A, the control module 156 uses the voltage across the battery 151 and at least one of the ID signal and the trigger signal to determine a pulse width modulation (PWM) duty cycle of the control signal output 158. When the control module is operating in an RMS power mode, the duty cycle can be based on the equation $$DC=(V_{DES}/V_{BATT})^2,$$

where DC is the duty cycle of the control signal output 158, $V_{DES}$ is the set point as indicated by at least one of the ID signal and the trigger signal, and $V_{BATT}$ is the voltage across the battery 151.

Alternatively, when the control module is operating in an average power mode, the duty cycle can be based on the equation $$DC=V_{DES}/V_{BATT}$$

The control module 156 can also use other equations to determine properties of the control signal. The other equations may illustratively be derived to determine amplitude for an amplitude modulated control signal or for a pulse-amplitude modulated control signal.

In an illustrative embodiment, the switching frequency of the PWM modulated control signal output 158 is above an audible range. By way of example and not of limitation, the switching frequency of the PWM modulated control signal output 158 may illustratively be above 32 KHz.

The regulator module 154 can be a buck, boost, or buck/boost regulator of a type such as linear, switching, pulse width modulated (PWM), discrete control mode (DCM), and/or any other type suitable for controlling the regulated voltage output 153 potential. An example PWM regulator is described in more detail in the U.S. patent application entitled "PROTECTION METHODS, PROTECTION CIRCUITS AND PROTECTIVE DEVICES FOR SECONDARY BATTERIES, A POWER TOOL, CHARGER AND BATTERY PACK ADAPTED TO PROVIDE PROTECTION AGAINST FAULT CONDITIONS IN THE BATTERY PACK", Ser. No. 10/959,193, filed Oct. 7, 2004, now U.S. Pat. No. 7,508,171, which is hereby included by reference in its entirety.

The regulated voltage output 153 potential is applied across the PCB contacts 142-1 and 142-3. The inductor 146 and capacitor 148 form a low-pass filter that provides a filtered DC voltage to the bulb 140. The low-pass filter reduces visible flicker from the bulb 140 and/or radio frequency (RF) emissions from the PCB 130 when the regulated voltage output 153 potential is provided by a pulsed or oscillating waveform, such as a PWM voltage. In some embodiments, such as those that provide an ID signal that corresponds to an RMS voltage, the low-pass filter may be omitted.

The ID module 165 is shown as being implemented with a resistor divider formed from the resistors R1 and R2, where the resistors R1 and R2 are selected to provide an ID signal that corresponds to the desired power mode. The ID module 165 thereby enables the battery pack 110 to be used with various flashlights 100 having bulbs 140 of various rated voltages. The ID module 165 also enables a particular flashlight 100 to be used with various battery packs 110 that have batteries 151 of various voltages. It should be noted that one of the resistors R1 and R2 could be located in the battery pack 110. The other resistor would then provide a single resistor solution to implementing the ID module 165.

It should also be appreciated the ID module 165 can be implemented using other devices to provide the ID signal. For example, the excitation voltage $V_H$ can include an alternating current (AC) component. The ID signal can then be generated by a network that includes reactive components such as capacitors and/or inductors. The excitation signal can also include a digital message, as may be the case if the ID module 165 is implemented with a microprocessor that executes a program stored in an attached memory.

The control module 156 can also include a soft-start module 172 that gradually increases the power that is delivered to the bulb 140 when the on/off signal is switched from an "off" state to an "on" state. Gradually increasing the power provides a mechanism for gradually heating the bulb 140 and generally increasing its mean time between failure (MTBF). In some embodiments, the control module 156 can linearly increase, over a predetermined amount of time, the RMS voltage to the bulb 140 from 0% to 100% of the bulb's 140 rated voltage.

The control module 156 can also monitor the voltage across the cells 152 and turn off the flashlight 100 when the voltage across the cells 152 falls below a predetermined voltage. Turning off the flashlight 100 when the voltage across the cells 152 falls below the predetermined voltage can increase the MTBF of the cells 152.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flashlight, comprising:
a housing having a removable battery pack engaging portion that engages a removable battery pack and including electrical contacts that engage contacts of the battery pack, the engaging portion electrical contacts including at least one power contact and at least one identification contact;
a bulb electrically coupled to the at least one power contact through a switch; and
an identification module coupled to the identification contact and providing an identification signal indicative of a power mode of the flashlight through the identification contact to the battery pack.

2. The apparatus of claim 1 wherein the power mode of the flashlight is a rated voltage of the bulb and the identification signal is indicative of the rated voltage of the bulb.

3. The apparatus of claim 2, wherein the identification module includes an electronic component a value of which is indicative of the rated voltage of the bulb.

4. The apparatus of claim 3 wherein the electronic component is a resistor.

5. The apparatus of claim 4 where the rated voltage of the bulb is any of an average voltage or a RMS voltage.

6. The apparatus of claim 2 wherein the identification module provides the identification signal upon being powered by the battery pack.

7. The apparatus of claim 1 wherein the housing of the flashlight includes a printed circuit board mounted therein and a connector containing the housing contacts, the printed circuit board having the connector, the identification module and the switch mounted thereon.

8. The apparatus of claim 7 including a filter circuit electrically coupled between the power contact of the flashlight and the bulb, the filter circuited mounted on the printed circuit board.

9. The apparatus of claim 8 wherein the filter circuit includes an LC filter and a free-wheeling diode.

10. The apparatus of claim 8 and further including a fuse mounted on the printed circuit board, the fuse electrically connected in series with the power contact of the flashlight.

11. The apparatus of claim 7 wherein components mounted on the printed circuit board include adhesive applied thereto to secure them to the printed circuit board to enhance drop/impact resistance.

12. The apparatus of claim 11 wherein the components to which adhesive is applied include the identification module, switch and connector.

13. The apparatus of claim 1 wherein the switch extends laterally through the housing and projects, when in an on position, out of one side of the housing and when in an off position, out of an opposite side of the housing.

14. The apparatus of claim 7 wherein the switch extends laterally through the housing and projects, when in an on position, out of at least one side of the housing and when in an off position, out of an opposite side of the housing.

* * * * *